Jan. 29, 1946.  E. O. TINKER  2,393,840
EXHAUST HEAT EXCHANGER
Filed Dec. 6, 1943   2 Sheets-Sheet 1
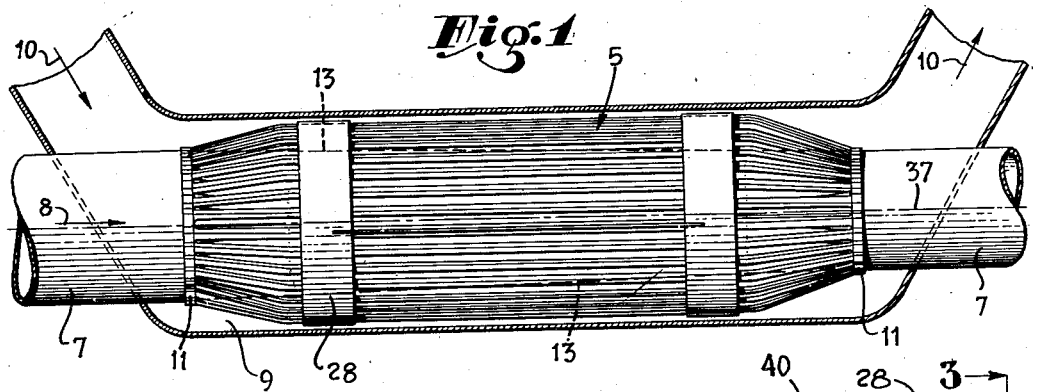
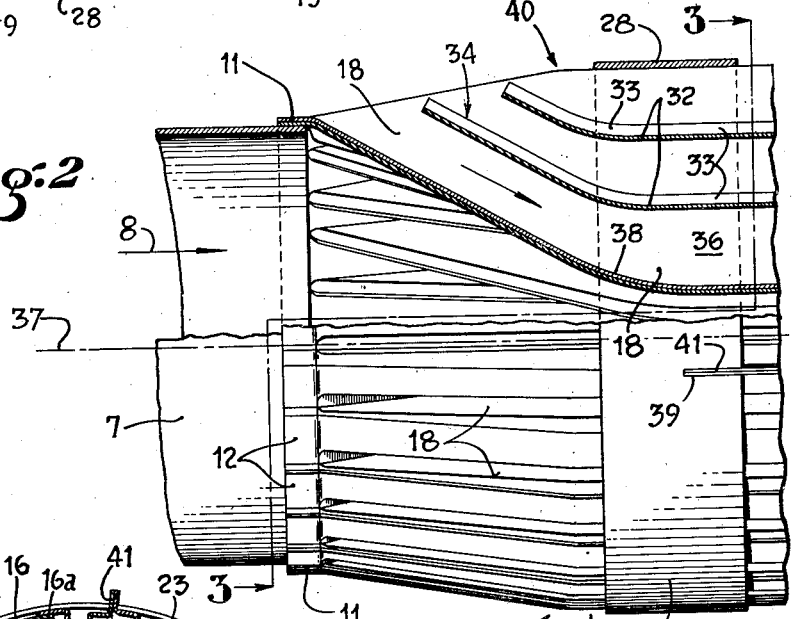
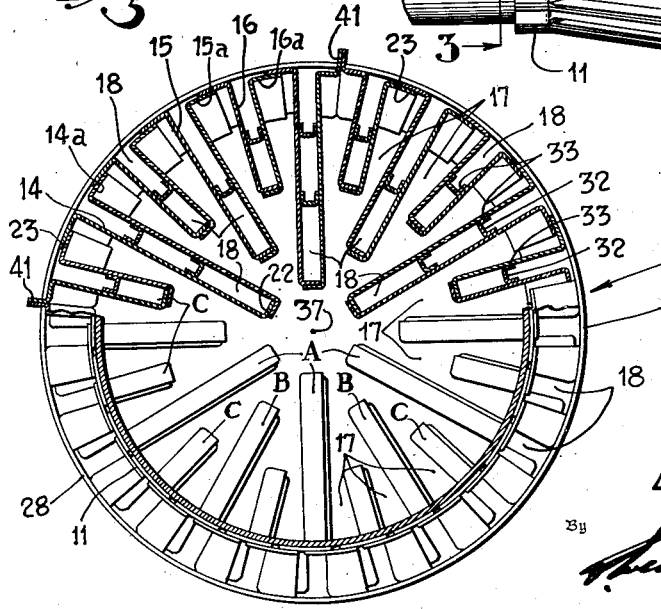
Inventor:
EUGENE O. TINKER,
By
Attorney.

Jan. 29, 1946.  E. O. TINKER  2,393,840
EXHAUST HEAT EXCHANGER
Filed Dec. 6, 1943  2 Sheets-Sheet 2
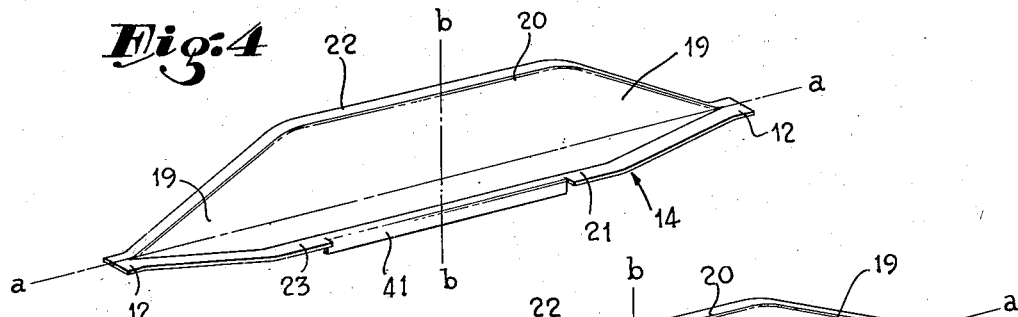
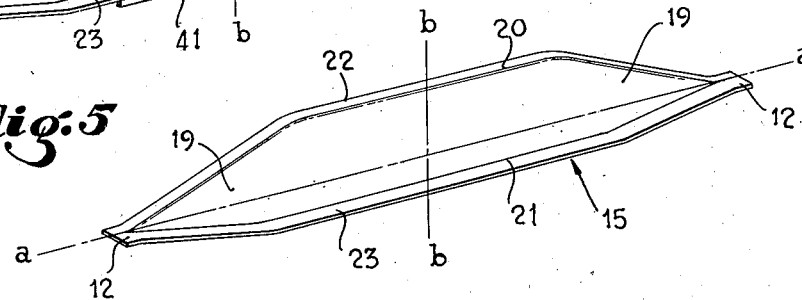
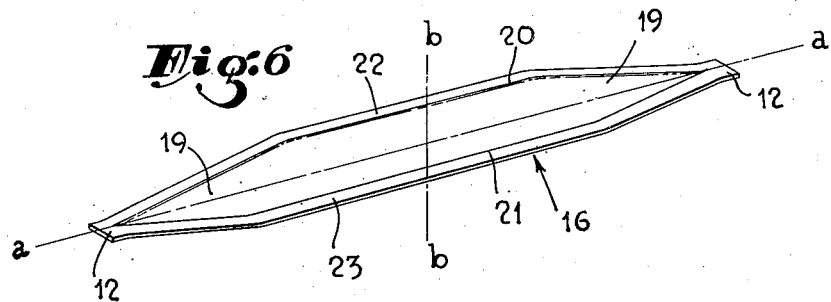
Inventor:
EUGENE O. TINKER,
By
Attorney.

Patented Jan. 29, 1946

2,393,840

UNITED STATES PATENT OFFICE 2,393,840

EXHAUST HEAT EXCHANGER

Eugene O. Tinker, Playa del Rey, Calif., assignor to The Garrett Corporation, Airesearch Manufacturing Company division, Los Angeles, Calif., a corporation of California Application December 6, 1943, Serial No. 513,111

1 Claim. (Cl. 257—246)

This invention relates in general to a simple and effective heat exchanger, which term as herein used includes evaporators and condensers for transferring heat from one fluid to another. One form as described herein relates in particular to a heat exchanger for transferring heat from engine exhaust gases into an air stream. A principal use of this form of the invention is in aircraft wherein the flow of air heated by the heat exchanger may be circulated to the hollow interior of the aircraft for the purpose of heating the same. The invention may also be used in aircraft for the purpose of removing sufficient heat from the engine exhaust gases as to render them ordinarily invisible in the outlet portion of the exhaust duct and in the adjacent external atmosphere and reduce the temperature of exhaust gases at the exhaust gas turbo inlet, thereby making the operating conditions for such a turbo less severe.

It is an object of the invention to provide a heat exchanger whose service life is prolonged by the prevention of high thermal stresses caused by uneven temperature distribution in the structure under conditions which may be made severe by a large difference in fluid temperature, such as between engine exhaust gases and atmospheric air.

It is an object of the invention to provide a light weight heat exchanger with a reasonable service life which may be installed in the severe operating conditions of corrosion, erosion, temperature, and vibration such as found in the engine exhaust stack, or exhaust manifold.

It is an object of the invention to provide a heat exchanger comprising interior and exterior fluid passages with no indirect heat conducting surfaces in the interior fluid stream, thereby forming a structure suitable for installation in an engine exhaust stack or exhaust manifold up stream from an exhaust turbo, as in the event any of the metal exposed to the exhaust gases flowing in the interior passage is burned, corroded or eroded completely through the loose pieces caused by such a failure would be carried outward into the exterior fluid passage by the escaping exhaust gases when the pressure in the exterior passage is lower than the pressure in the interior passage.

It is an object of the invention to provide an efficient heat exchanger, which has a high ratio of heat transfer to pressure drop in the two fluid streams, or this may also be stated as a low amount of work or energy required or expended in transferring the heat.

It is a further object of the invention to provide a simple and light weight heat exchanger having the utility herein described, which may be readily made from metal stock by the use of known metal fabricating, forming and welding apparatus and methods.

Further objects and advantages of the invention may appear throughout the following part of this specification.

Referring to the drawings, which are for illustrative purposes only,

Fig. 1 is a view showing a preferred embodiment of the heat exchanger located in an air passage.

Fig. 2 is an enlarged fragmentary, partly sectioned, view of the leftward end of the heat exchanger.

Fig. 3 is a cross-section, taken as indicated by the line 3—3 of Fig. 2.

Fig. 4 is a perspective view of one of the formed plates employed in multiplicate in constructing the heat exchanger.

Fig. 5 is a perspective view of another one of the formed plates employed in multiplicate in constructing the heat exchanger.

Fig. 6 is a perspective view of another one of the formed plates employed in multiplicate in constructing the heat exchanger.

In Figs. 1 and 3 the heat exchanger 5 is shown as providing a plurality of interleaved thin walled interior channels 17 and exterior channels 18 disposed in parallel relation to the longitudinal axis 37 of the heat exchanger and in substantially parallel relation to each other, in surrounding relation to the axis 37 so as to define an interior passage through which the exhaust gases flow. There are means at the opposite ends of the heat exchanger for connecting it to the adjacent portions of the exhaust stack 7. This arrangement causes the two fluid streams to flow through the heat exchanger 5 in an essentially parallel relation, either in the same direction, often referred to as concurrent flow, or in the opposite direction, often referred to as counter flow. Uniform temperature distribution in the structure throughout any cross section normal to the longitudinal axis 37 is accomplished by the combining of said concurrent or counterflow with proper fluid distribution, as described hereinbelow, and with fluid channels 17 and 18 of sufficient dimensions to ensure turbulent flow under operating conditions, which may be described by Reynold's numbers materially in excess of 3000. When the temperature in a structure can be maintained uniformly over all cross sections normal to a longitudinal axis, the main thermal stresses may be relieved by allowing for the axial expansion of the structure in the installation.

As seen in Fig. 3, the interior channels 17 and exterior channels 18 are of varying radial extent, as indicated at A, B, and C, the longer channels A extending closer to the axis 37 than the channels B, and the channels B extending closer to the axis 37 than the channels C, in this manner presenting, as shown, a staggered series of channels, offering thereby the maximum surface of impingement of the hot gas through the interior passage defined by said channels A, B, and C, and hence producing a maximum transfer of the heat of the hot gases to the fluid flowing through the outer channels 18.

The desired maximum heat transfer in the inner fluid channels is preferably, but not necessarily, obtained by maintaining approximately a uniform cross sectional area of the inner fluid passage at any cross section perpendicular to the inner fluid flow direction at any longitudinal position between the annular end members 11. Changes in this cross sectional area can be present with satisfactory results. The desired fluid flow distribution in the outer fluid channels 18 is obtained by a means, such as members 32, for distributing said fluid flow approximately uniformly throughout the outer channels 18 except it is apparently desirable to deflect an excess fluid flow along the bottom of the tapered end portions 38 of the channels to prevent overheating caused by the direct impingement of the hot fluid in the inner passage on these portions. These members 32, besides the function ascribed to them, are useful to reenforce the channel structure and to hold the channels spaced.

In Fig. 1 the heat exchanger 5 is shown connected to adjacent portions 7 of the exhaust stack, through which engine exhaust gases pass as indicated by arrows 8. The heat exchanger 5 is located within a passage or chamber 9, through which air to be heated is moved in a selected direction, as indicated by arrows 10.

As indicated by dotted lines 13, the adjacent portions of the exhaust stack define a prismoidal space or imaginary solid, extending from one member to the other. These dotted lines 13 represent the bounds of a path of flow for the gas. For the purpose of explanation and description, to be hereinafter given, the dotted lines 13 may be referred to as defining the surface of an imaginary solid or prismoidal volume of space having portions 7 of the stack at the ends thereof.

In order to provide a light weight heat exchanger by using thin metal walls between the inner channels 17 and outer channels 18, some means must be employed to reduce the bending stresses in the walls caused by the difference in pressure between the inner and outer fluid streams. There are many ways this may be accomplished, such as by ribbing, curving, or otherwise forming the walls, or by reducing the length of the span of the channel wall. In the illustrative drawings hereto attached, the member 32 was also utilized as a means of dividing said span into two parts, thereby reducing materially the maximum bending stresses encountered.

To provide a heat exchanger as herein described with no indirect heat conducting surfaces in the interior fluid passage, means are required for maintaining the proper dimensions and space relationship of the inner and outer channels 17 and 18. Said means are furnished by the interaction of rings 28 fastened to the outer end 40 of each inner channel 17, and the members 32, in any desirable manner.

To provide an efficient heat exchanger the heat transfer surfaces are all swept directly by both fluid streams, enabling a reduction in the exposed friction-producing surface from that required if indirect heat conducting surfaces were used; the entrances to and exits from the channels 17 and 18 are rounded so as to provide more favorable fluid flow conditions than found in sharp cornered entrances and exits; and the fluid flows are desirably distributed as hereinabove described.

As best shown in Fig. 3, the heat exchanger is made from sheet stock, comprising a plurality of series of spaced plates 14 and 14a, 15 and 15a and 16 and 16a, alternately disposed in side by side relation and in consecutive order so as to cross the imaginary cylindric surface which is defined by the portions 7 of the stack and which is indicated by the dotted lines 13. These plates 14 and 14a, 15 and 15a, and 16 and 16a are respectively of varying areal dimensions and are shown as lying in radial planes of different extent, such as the radial plane indicated by the phantom line 4—4 of Fig. 3, and provide, as shown, the interior channels 17 of varying radial extent.

These plates 14, 15 and 16, except for dimension—that is, variation in depth thereof—are substantially identical and have tapering ends 19, the upper and lower longitudinal edges being provided with the flanges 22 and 23 respectively, as heretofore stated, which project from respectively opposite sides of the plates. It will be recognized, however, that the planes in which the plates 14 and 14a, 15 and 15a, and 16 and 16a, lie need not be truly radial, but that a preferred condition is that they cross the imaginary cylindric surface 13. As further shown in Fig. 3, the plates 14 and 14a, 15 and 15a, 16 and 16a have flanges 22 along the inner edges thereof and flanges 23 along the outer edges thereof, which flanges are connected together, by welding or other suitable methods of joining, to alternately connect the inner and outer edges of the radiating plates 14 and 14a, 15 and 15a, and 16 and 16a, in a manner to form between the plates alternate inner and outer channels 17 and 18 of varying radial extent. The inner channels 17 are open to the interior of the heat exchanger 5, and, being longitudinally directed, receive a portion of the hot exhaust gas, whereby heat therefrom will be conducted through the series of plates 14 and 14a, 15 and 15a, and 16 and 16a to air which flows longitudinally through the outer channels 18.

In Figs. 4, 5, and 6 I show plates 14, 15, and 16 in perspective. These plates have tapered ends 19 resulting from the convergence of the inner and outer (upper and lower) longitudinal edges 20 and 21 thereof, the angle of convergence varying in each plate according to the extent or depth of the web thereof, which, in the illustrations Fig. 4, Fig. 5, and Fig. 6, is shown varying to provide plates whose greatest areas lie above the central longitudinal axis thereof. A flange 22 is turned leftward from the upper edge 20 of the plate 14 and a flange 23 is turned rightward from the lower edge thereof. These bends made by turning the flanges are of suitable radius so as to provide the rounded entrances and exits of the channels formed by the plates 14 and 14a, 15 and 15a, and 16 and 16a, as herein described. The flanges 22 and 23 extend substantially perpendicular to the plates 14, 15 and 16 and merge with the plate portions 12 and the ends of the plate 14, which plate portions 12 lie perpendicular to the plane defined by the plate 14 and on the line a—a comprising the longitudinal axis of the plate 14. The plates 14, 15, and 16 and the flanges 22 and 23 thereof, and the end plates 12 are formed by stamping process from a single sheet of metal. The plate 14, Fig. 4, may be rotated through an angle of 180° about the transverse axis b—b so that it will then become the plate 14a in the heat exchanger assembly. When the plates 14, 15 and 16 are turned end for end about the axis b—b, the inner flanges 22 thereof will project rightward and the outer or lower flanges 23 will project leftward. In the heat exchanger assembly, as shown in Fig. 3, the plates 14, 15, and 16 are disposed with their inner flanges 22 faced clockwise and their outer flanges 23 faced counterclockwise. The plates 14a, 15a, and 16a have the inner flanges 22 thereof faced counterclockwise so as to engage the flanges 22 of the plates 14 15, and 16 and the plates 14a, 15a, and 16a have their outer flanges 23 faced clockwise so as to engage the flanges 23 of the plates 14, 15, and 16. It will be noted that the flanges 22 are narrower than the flanges 23. The engaging flanges 22 and 23 are connected, for example, by continuous spot welding, thereby uniting the alternate plates 14 and 14a, 15 and 15a, and 16 and 16a into a continuous structure. When the plates are assembled, the plate portions 12 and the ends thereof overlap and are welded together so as to form the ring-like end members 11 of uniform thickness, which, if desired, may be welded to the cylindrical end portions 7 of the stack, or connected therewith in any other desirable manner.

Means for supporting the intermediate portions of the plates 14 and 14a, 15 and 15a, and 16 and 16a, and for directing air into the bottoms or inner portions of the air channels 18 comprise metal strips 32 disposed in the external channels 18 in the manner shown in Figs. 2 and 3. These metal strips 32 have flanges 33 which are secured to adjacent walls 14 and 14a, 15 and 15a, and 16 and 16a. The ends of the strips 32 are curved outwardly as shown at 34 so that they will serve as baffles for directing portions of the air stream, as indicated by arrows 35, into the inner portions 36 of the outer channels 18.

Rings 28 are placed around the assemblage of plates 14 and 14a, 15 and 15a, and 16 and 16a, and are fastened to the flange 23 of each plate 14 around the circumference to limit the expansion of the heat exchanger 5 and to hold and maintain the petals, composed of plates 14 and 14a, 15 and 15a, and 16 and 16a, in the proper space relationship. These rings may be firmly associated with the plate assembly, as by transverse slots 39, which cooperate with outwardly projecting lugs 41 on certain, or all, of the flanges 23 of the respective plates. When so engaged and welded in the assembly, the portions of the lugs protruding beyond the peripheral surface of said rings are removed in any manner.

I claim as my invention:

A heat exchanger of the character described, comprising: a plurality of cooperating pairs of plates conjoined at the ends thereof to form rings for connecting the heat exchanger to an exhaust stack, said rings defining an imaginary surface of an imaginary solid extending between said rings, said pairs of plates being of varying depths and connected at the edges thereof in spaced relation to provide alternate inner and outer channels of varying radial depths disposed to cross said imaginary surface; and means for maintaining said plates in proper relationship, said means comprising lugs on said plates and rings fitted over said plates and having slots to receive said lugs.

EUGENE O. TINKER.